United States Patent [19]
Goldstein

[11] Patent Number: 5,452,330
[45] Date of Patent: Sep. 19, 1995

[54] BUS-ORIENTED SWITCHING SYSTEM FOR ASYNCHRONOUS TRANSFER MODE

[75] Inventor: Fred R. Goldstein, Arlington, Mass.

[73] Assignee: Digital Equipment Corporation, Maynard, Mass.

[21] Appl. No.: 909,555

[22] Filed: Jul. 6, 1992

[51] Int. Cl.⁶ .......................... H04B 3/00; H04L 7/00
[52] U.S. Cl. ................................. 375/257; 375/356; 370/85.11
[58] Field of Search ............... 375/36, 107, 257, 356; 370/85.7, 85.8, 95.1, 95.2, 85.11, 85.1, 85.12; 340/825.07, 825.08

[56] References Cited

U.S. PATENT DOCUMENTS

| | | | |
|---|---|---|---|
| 3,870,825 | 3/1975 | Roberts et al. | 370/85.11 |
| 4,656,627 | 4/1987 | Hasley et al. | 370/85.11 |
| 4,669,079 | 5/1987 | Blum | 370/85.6 |
| 4,811,336 | 3/1989 | Backhaus et al. | 370/85.12 |
| 4,872,003 | 10/1989 | Yoshida | 340/825.08 |
| 5,014,269 | 5/1991 | Picandet | 370/85.11 |
| 5,029,164 | 7/1991 | Goldstein | 370/95.1 |
| 5,132,680 | 7/1992 | Tezuka et al. | 340/825.07 |
| 5,200,743 | 4/1993 | St. Martin et al. | 340/825.07 |

*Primary Examiner*—Stephen Chin
*Assistant Examiner*—Tesfaldet Bocure
*Attorney, Agent, or Firm*—Arnold, White & Durkee

[57] ABSTRACT

A local network system is provided using ATM-like framing and cells for data transmission. A bus architecture is defined, making the cost per port relatively low compared to matrix switching. For high performance, the bus is bit parallel instead of being a serial link. Like other LANs, the average bandwidth per interface (per port) is a low percentage of the peak bandwidth. A single physical bus is used to interconnect a potentially large number of ATM interfaces, on the order of hundreds. The system employs a bus master which provides timing and resolves all arbitration requests. Interfaces connected to the bus are allotted at least one cell per frame for sending data, and write to the allotted cell in synchronization with the frame, cell and bit clocks circulated on the bus from the master. There are more cells than interfaces, so when an interface has a large data block to send it asks for allocation of more cells per frame, and the request is granted by the master coordinated with other demands on the system. This bus arrangement allows construction of a switching system providing asynchronous transfer mode (ATM) cell switching with an aggregate throughput defined by the bus transfer speed, potentially in the multi-gigabit range, while also allowing the bus to be used for pre-arbitrated (isochronous) transmission. The bus uses a "traveling wave" technique to allow arbitrary physical length (many times the transit distance of one bus cycle) while using a simple, lower-speed sub-bus for bandwidth arbitration.

27 Claims, 5 Drawing Sheets

BUS-ORIENTED SWITCHING SYSTEM FOR ASYNCHRONOUS TRANSFER MODE

BACKGROUND OF THE INVENTION

This invention relates to telecommunication networks, and more particularly to a bus-oriented asynchronous transfer mode (ATM) communication network used in a LAN (local area network) configuration.

Asynchronous transfer mode (ATM) is a communications technology on which messages from a large number of sources are concentrated into a single path by asynchronous time division multiplexing. The communications medium itself is synchronous, in that bits are sent at a fixed speed, often within frames; cells are sent within frames, and octets within cells. From the standpoint of a given port, communications are asynchronous in that information in the form of cells is sent on demand and the cells assigned to transfer a message may be irregularly ordered without regard to position within frames. In ATM systems, a port or station in the network may be a concentrator, a single-use or multiple-use computer, or another communicating device.

Local area networks (LANs) for communications among a few dozen or a few hundred desktop stations have not previously made use of ATM methods. Instead, LANs are usually of the asynchronous type, in that messages are sent by a station upon demand, and a regular ordered communication path is not continuously maintained. The technologies most used for LANs are Ethernet, token ring, FDDI, at the like.

Traditional LAN technology is distinctive from traditional wide-area network (WAN) technology used for nationwide or global communications networks. LANs operate asynchronously, but data needs to be converted to a different format for transmission across the WAN, which may or may not use ATM techniques. Traffic concentrators with suitable conversion facilities are of course available.

In order to provide a more seamless match between a local network and a wide area network, it may thus be appropriate to use an ATM type of communications system as a LAN. Also, it is expected that the demand for higher levels of performance in LANs will dictate an ATM type of technology for local systems. In adapting ATM technology for use as a LAN, a switching architecture is required that economically provides for many high-speed ports. Large crossbars or other matrices, whose cost per port rises relatively quickly (as the size of a matrix grows more rapidly than the number of ports), are an expensive option. While a central office-oriented ATM switch must cope with aggregate traffic rates that reflect a relatively high average utilization of each interface, an ATM switch aimed at providing the primary LAN service to many end-user desktops need merely provide an aggregate bandwidth equal to the total demand from every user of the switch, averaged over an acceptable latency.

Accordingly, an objective is to provide an asynchronous communication method for a local network, at relatively low cost yet high performance, so that an interface with ATM networks is facilitated.

SUMMARY OF THE INVENTION

In accordance with one embodiment of the invention, a small-scale, local network system is provided using ATM-like framing and cells for data transmission. Following PBX practice, a bus architecture is defined, as this makes the cost per port relatively low, compared to matrix switching. For high performance, the bus is bit parallel instead of being a serial link as in traditional LANs. Like other LANs, the average bandwidth per interface (or per port) is a low percentage of the peak bandwidth, and a LAN hub switch need only provide LAN-like total bandwidth, scaled up to meet the demands of systems of the next generation. This embodiment uses a single physical bus to interconnect a potentially large number of ATM interfaces, on the order of hundreds. Larger requirements may make use of other network interconnection techniques, such as cross-links or smaller matrix switches, to link multiple buses. Direct interconnection to other LANs is also provided.

The system employs a bus master which provides timing and resolves all arbitration requests. Interfaces connected to the bus are allotted at least one cell per frame for sending data, and write to the allotted cell in synchronization with the frame, cell and bit clocks circulated on the bus from the master. There are many more cells than interfaces, so when an interface has a large amount of data to send it asks for allocation of more cells per frame, and the request is granted by the master coordinated with other demands on the system.

A bus arrangement described herein allows construction of a switching system that can provide asynchronous transfer mode (ATM) cell switching with an aggregate throughput defined by the bus transfer speed, potentially in the multi-gigabit range, while also allowing the bus to be used for pre-arbitrated (isochronous) transmission. The bus uses a "traveling wave" technique to allow arbitrary physical length (many times the transit distance of one bus cycle) while using a simple, lower-speed sub-bus for bandwidth arbitration. The bus master provides timing and resolves all arbitration requests. Bus arbitration is centralized in such a manner as to permit optimization of time slot allocation, supporting slotted (plesiochronous transfer mode, or PTM) as well as random asynchronous (ATM) cells. PTM is disclosed in my copending application Ser. No. 509,563, filed Apr. 13, 1990.

BRIEF DESCRIPTION OF THE DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings, wherein:

DETAILED DESCRIPTION OF SPECIFIC EMBODIMENT

Figure 1:
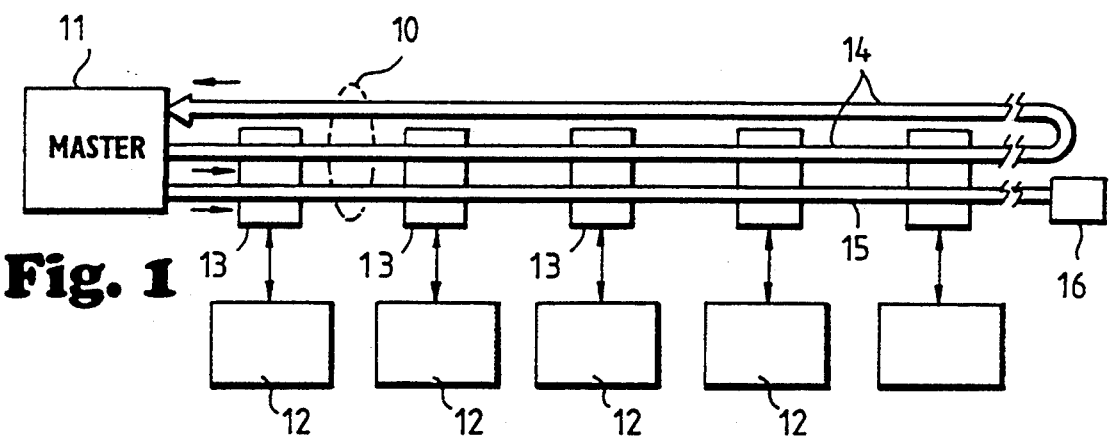
FIG. 1 is an electrical diagram in block form of a communications network according to one embodiment of the invention.

Referring to FIG. 1, a communications system for interconnecting a number of computers or the like is shown which may use the ATM bus arrangement of the invention. A multi-conductor parallel data-transfer (DT) bus 10 interconnects a master station 11 with a number of ports 12 (such as computers or terminal equipment), each coupled to the bus by an interface 13. Multiple ports 12 may share an interface 13. The bus 10 has a transmit or send sub-bus 14 (DS bus) which passes through each interface 13 then loops back to the master station 11, and has a receive sub-bus 15 (DR bus) originating at the master station 11 and passing through each of the interfaces 13 before ending in a terminator 16. The ATM cells are sent only by the master station 11, which is why the send sub-bus 14 originates in the bus master and looped around; cells are initially emitted, empty, along with clock pulses, then overwritten at an interface 13 granted permission to send by the master. Data is sent by the ports 12 only on the sub-bus 14, and is received at a port 12 only on the sub-bus 15. An ATM technique is used for managing data transmission on the bus 10, employing a clocked frame 17 illustrated in serial format in FIG. 2, of constant size, and within the frame 17 are a relatively large number of cells 18, e.g., about 2000 cells per frame, so there are many more cells than interfaces 13 and each interface can be allotted at least one cell. Each cell contains fifty-three octets 19, of which forty-eight are payload and five are a header. Each octet contains eight bits. The interfaces 13 can send data only in one or more cells per frame assigned to them by the master station 11, on a time-slotted basis. The frame 17 format repeats on a continuous basis. In actuality, the frame circulates in 32-bit parallel format instead of the serial format depicted in FIG. 2.

Figure 3:
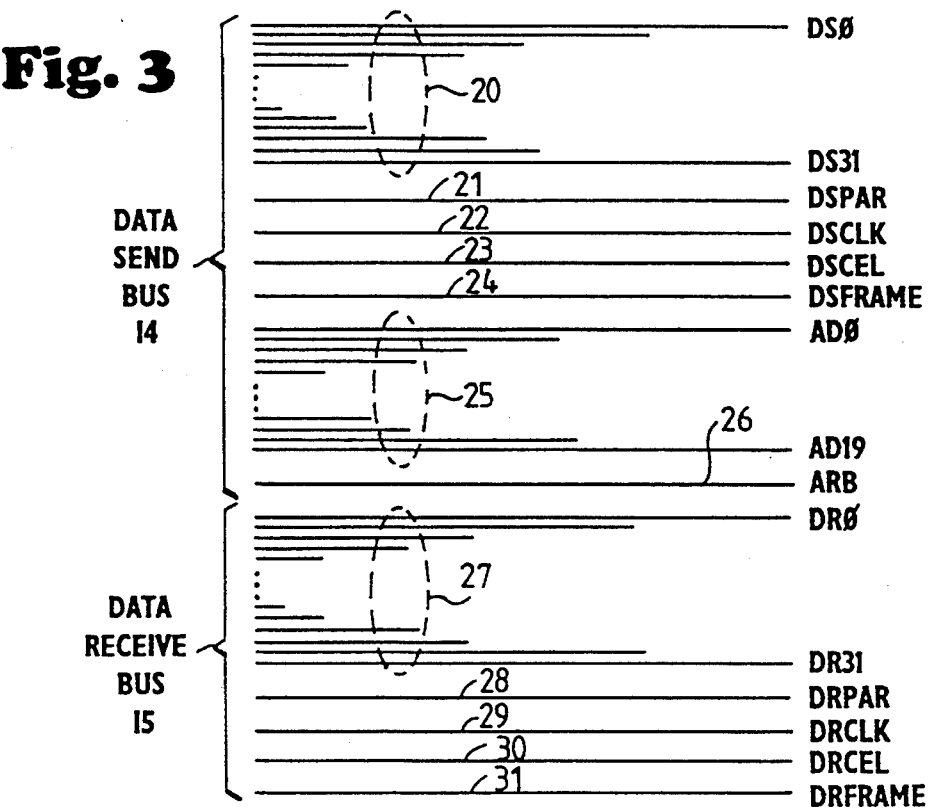
FIG. 3 is an electrical diagram of the parallel bus used in the system of FIG. 1, according to one embodiment.

The structure of the active connections in the bus 10, according to one embodiment, is illustrated in FIG. 3. The send sub-bus 14 has 32-bit parallel data-transfer send lines 20, (DS0-DS31), along with a data-send parity bit on line 21 (DSPAR). A data-send transfer bit clock (DSCLK) is on line 22, to clock the octets (four octets in parallel on the 32-bit data lines for each clock). A data-send transfer cell clock (DSCEL) is on line 23, to clock the cells 18 (there should be thirteen bit clocks per cell clock). An 8-kHz frame clock (SFRAME) is on line 24, defining the frames 17 (such as 25K bit clocks or about 2000 cell clocks per frame clock). A 20-bit port address is on lines 25 (AD0-AD19), although the number of address lines may be more or less than twenty in other embodiments depending upon the system requirements. A 1-bit arbitration request line 26 (ARB) is used by the ports 12 to request additional allotment of cells per frame.

The receive sub-bus 15 in this example consists of a 32-bit parallel data-transfer receive function on lines 27 (DR0-DR31), along with a data-receive parity bit (DRPAR) on line 28. A data-transfer bit clock (DRCLK) is on line 29, a data-transfer cell clock (DRCEL) on line 30, and a frame clock (RFRAME) on line 31; these receive clocks are of course of the same timing as the send clocks on lines 22-24. Although the data send and receive buses 20 and 27 are 32-bit buses in this example, other sizes may be employed, such as 16-bit or 64-bit.

The speed of the data transfer DT lines (DS0-31, DR0-31, and associated parity) is selected to be a value that can be implemented in practical, affordable circuitry, for the particular system. For example, a value of 25-MHz (providing a 40-ns bit period) may be used as the bit clock (DT clock or data transfer clock) in an example embodiment. The actual data transfer rate is then thirty-two times this (800-Mbit/sec), as data is parallelized for transmission on the bus 10. In other embodiments, bit clocks of up to perhaps 100-MHz may be employed using current technologies, at greater expense, of course.

Figure 4:
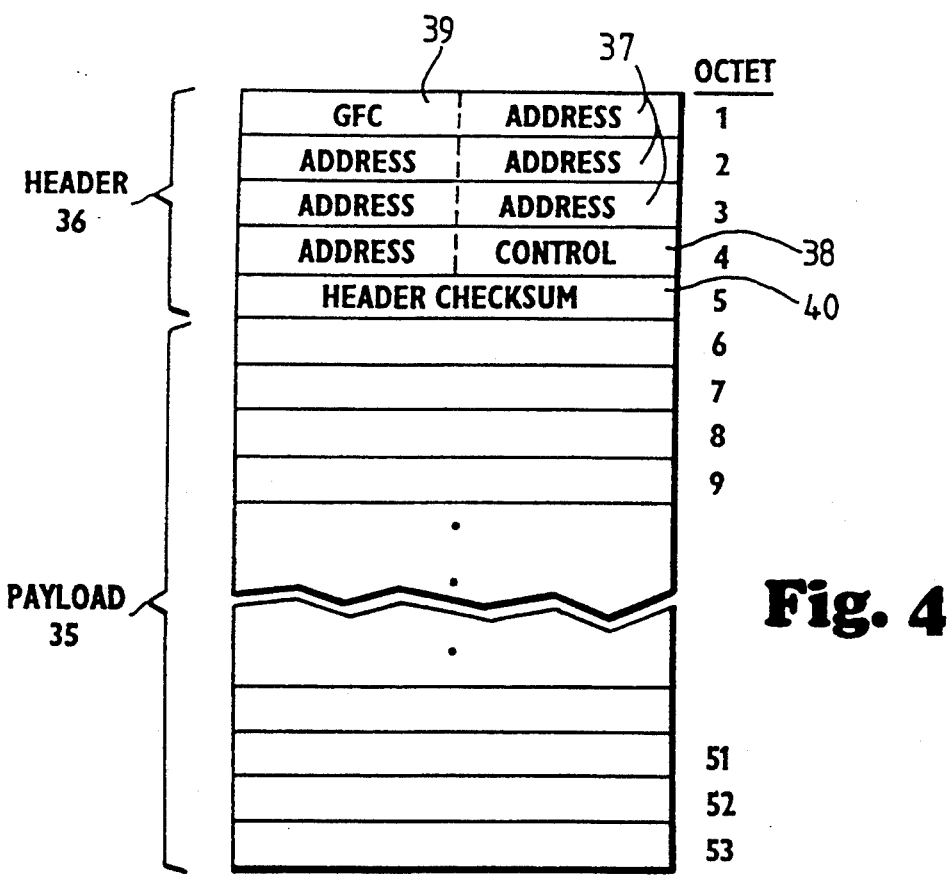
FIG. 4 is a diagram of an ATM cell format.

The ATM cell transfer unit is defined by a CCITT ATM standard (an international standard), as illustrated in FIG. 4. A 53-octet cell 18 is defined, which includes a 48-octet payload 35 (octets 6-53). The cell includes a 5-octet (40-bit) header 36, in which a 24-bit address field 37 in defined. Although 24-bits are available for addressing, typically no more than twenty are needed at any given customer premise. This address may be a virtual path address, and/or a virtual channel address. Note that the address 37 is different from the address on lines 25 which is the interface 13 address used by the master 11 to select one of the interfaces 13 for telling it that it may overwrite the next cell. Four bits in a field 38 are used for control functions (e.g., cell type and priority), four bits in field 39 are used for "generic flow control" (GFC) distributed arbitration, and an 8-bit header checksum field 40 is provided. The header checksum has local significance and need not be carried across this switch; it can be generated at each interface 13. The GFC bits of field 39 are also local and not required. This allows the entire header 36 (the four octets 1-4) to be transmitted in one 32-bit DT bus cycle on bus 10, and the payload 35 to be transmitted in twelve DT clock cycles. Thus a single cell 18 is sent during thirteen DT clock (bit clocks on lines 22 and 29) cycles.

Figure 2:
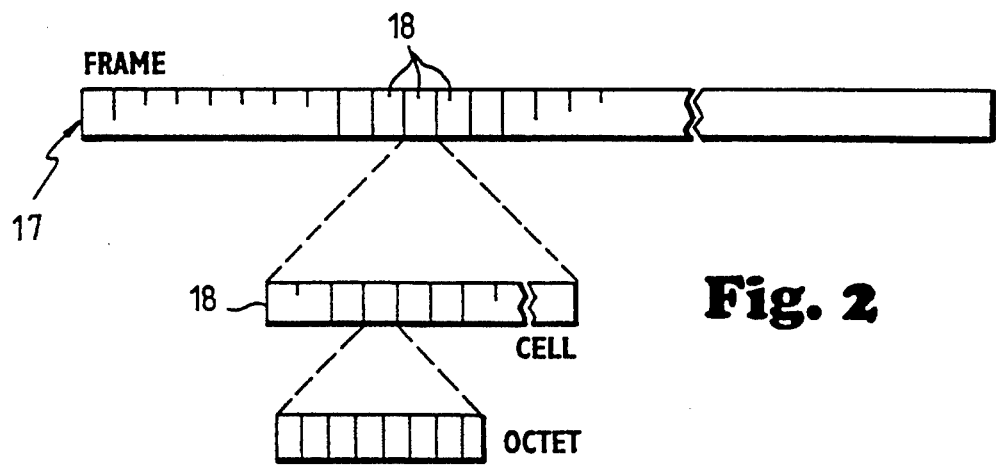
FIG. 2 is a diagram of an ATM frame, cell and octet format in serial form.
Figure 5:
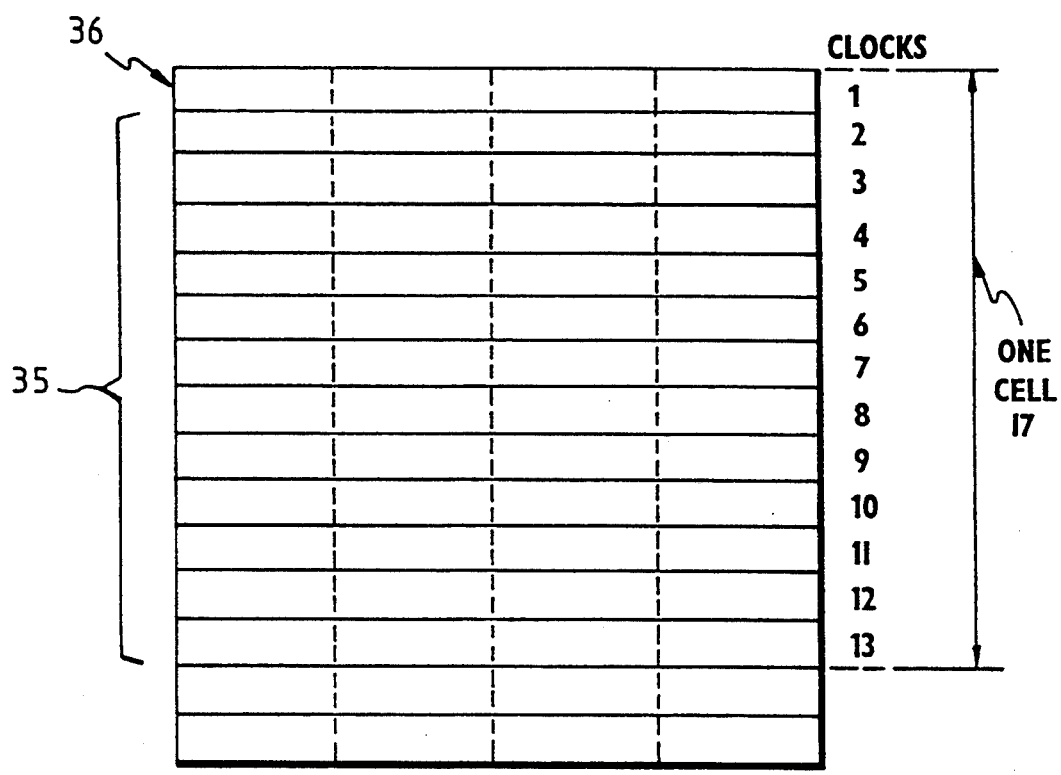
FIG. 5 is a diagram of an ATM cell as it appears on the bus of FIG. 1, in one embodiment.

Referring to FIG. 5, a cell 18 of FIG. 2 or FIG. 4 is transferred on the data-send and data-receive sub-buses 14 and 15 in thirteen bit clocks (numbered 1-13) as 32-bit parallel data, four octets being transferred on each clock.

In operation of the bus 10, the bus (slot) master 11, at the end of the bus, takes control of all data transfer activity. Arbitration under the control of the bus master 11 controls the usage of the send sub-bus 14. The bus master 11 sends DSCLK on line 22 at the strobe rate of the DT bus (i.e., 25-MHz for a 40-ns bus). It sends DSCEL on line 23 to indicate the beginning of each cell 18, strobing once per cell (during the last DSCLK cycle of each cell, in one embodiment). The frame clock on line 24 sent by the master 11 indicates the master timing frame, in one embodiment based upon an 8-kHz telecommunications network clock. Bus time slots for cells are allocated relative to this frame 17 defined by the frame clock.

All ATM cells 18 are sent during a time slot (thirteen DTCLK cycles on line 22) that is granted to a given interface 13 by the bus master 11. Arbitration takes place using the address lines 25 and ARB line 27. The ATM system makes use of a virtual channel model, wherein each virtual channel is allocated a committed information rate (CIR) and can also send data bursts beyond that value. The bus arbitration scheme takes advantage of the CIR. Any given interface 13 is granted at minimum, with no explicit request of the bus master 11, the number of time slots during each frame required to service the CIR for each of its virtual channels. Each interface card 13 receives at least one slot (one cell 18) per frame 17. Additional bandwidth is then available via contention. At a given time, virtual channels will have been set up by a suitable protocol, so a given interface 13 may be servicing one or more virtual channel identified by a channel ID (identification number, likened to an address).

Data is sent, i.e., cells are emitted by the interfaces 13 under direction from the master 11. The address bus 25 (AD0–AD19) is driven by the master 11 to indicate to the interfaces 13 the ownership of each data-send sub-bus 14 time slot in the cells (time slots) of a frame 17. During each time slot (consisting of thirteen DSCLK cycles, one DSCEL cycle), the address lines 25 indicate the owner (potentially by other port numbers, interface numbers, or virtual channel ID, to be recognized by one interface 13 as owner of that address) of the next time slot. This gives the interface 13 a few DSCLK cycles to start loading the contents of its internal buffer for one cell (time slot), into its outgoing data send buffer. Then when the next time slot begins, one cell is emitted onto the data-send bus 14 in synchrony with thirteen strobes of DSCLK on line 22.

The length of the bus 10 is such that multiple DSCLK cycles are present at one time at different points along the bus. Thus the data-send information is only readable at one point on the bus 14 (the cell sink), that being the end of the bus most distant from the DSCLK source. The data-send bus 14 is looped; the bus master 11 functions as both clock source and cell sink, so the master itself is the point most distant form the DSCLK source (which is also the master).

Figure 6:
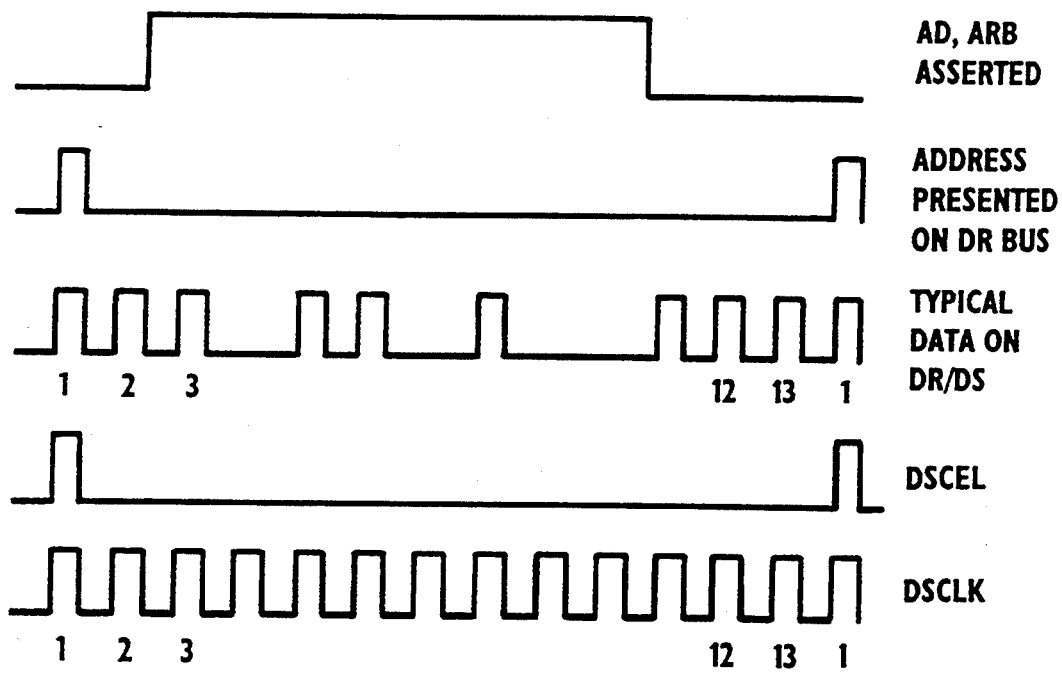
FIG. 6 is a timing diagram of clocks and activities on the data-send and data-receive buses of FIG. 1.

Data is received, i.e., cells are received at each interface 13 or port 12 based on virtual channel IDs (cell header addresses). Each interface 13 maintains, within itself, a list of which virtual channel IDs it is interested in receiving. The channel IDs are assigned by the master 11 and sent to the ports 12, so if a port 12 was to receive a message from another port the master 11 would have previously sent to this port a message giving the channel ID that it should be interested in receiving. So, the list of channel IDs to receive is dynamically changing at each port, under direction of the master 11. These channel IDs may be unicast or multicast by the master 11 to the ports 12. The bus timing is illustrated in FIG. 6, where the first DRCLK cycle of each cell 18 (clock-1 of FIG. 5) has the channel ID on the data-receive bus 15, in the address field 37. The interface 13 then either discards or forwards the cell 18 to its own egress buffers, depending upon the address in field 37. The interface has the duration of the DRCEL clock (i.e., thirteen bit clocks or 13*40-ns, or 520-ns for a 40-ns DT bus clock) to perform this decision before the next cell 18 arrives. Note that the address bus 25 is only used for cell emission (sending) by interfaces 13, not reception on sub-bus 15 by the interfaces. The data-receive sub-bus 15 does not have an address bus like the address bus 25 of the data-send sub-bus, but instead employs the address field 37 of the header in the first clock period of the cell itself.

In order to avoid conflict between overlapping DT time slots, there is only one source for driving data onto the DR sub-bus 15, which is the bus master 11. Thus, to accommodate sending data between ports 12, the bus master 11 simply loops around all cells from the DS sub-bus 14, synchronously, onto the DR sub-bus 15. This is handled with minimum latency (next DRCEL cycle if possible; slightly longer if channel ID validation within the master 11 is employed). A port 12 can thus send data on sub-bus 14 addressed to another port 12, but this data passes through the master 11 and goes back out on the sub-bus 15 before being extracted from the bus by the receiver. The interfaces do not monitor the addresses in the first octets of cells 18 passing through on the data-send sub-bus 14, but instead monitor the data-receive sub-bus 15 to find cells addressed to them.

Arbitration is handled by the master station 11. The DT bus 10 (DS and DR) is synchronous, with some number of cell time slots per frame 17. If, for example, the bus runs at 25-Mbps and a frame 17 is set at 1-ms in length, then a frame has 1923 cells 18, and if the bus master 11 granted one cell per frame to a virtual channel, then that virtual channel would have a bandwidth of 384-Kbps. Arbitration requires that each interface 12 be granted at least one time slot (one cell) per frame 17 at all times; however, this does not mean that every virtual channel requires one time slot per frame, as the interface 12 may itself arbitrate as required to service demand from as many virtual channels as it has active at any given time. That is, processes executing on a workstation forming a port 12 may have a number of pending messages being sent to or received from other ports of the network, and a virtual channel has previously been established for each one of these. A simpler embodiment of interface operation may, however, forego this in favor of direct arbitration per virtual channel; in such a case, the number of cells per frame may need to be increased in the interest of bandwidth granularity—the actual frame duration may have network-wide significance in a slotted-ATM or plesiochronous-transfer network, so the value of cells per frame may not be purely arbitrary.

The bus master 11 grants cells (DS bus slots) to each interface 12, via the address bus 25, in accordance with the sum of the committed information rates for all channel IDs existing on that interface. These are optimally distributed across the frame 17, such that maximum inter-cell distance is maintained, in order to perform a shaping (smoothing) effect upon traffic, among other reasons. This allocation of slots is a function performed by the bus master 11.

Each interface 12 maintains a significant pool of access buffers to hold outgoing data traffic. When the utilization of these buffers exceeds a (low) threshold, i.e., the buffers approach a full state, then the interface 13 may request additional bandwidth allocation from the master 11. This is done by setting the ARB line 26 during the cycles that have been granted to it by the bus master 11. The ARB line 26 is significant only once per cell, so arbitration runs at a relatively low speed (based upon the cell clock DTCEL, not the bit clock DTCLK). When a cell 18 arrives at the cell sink at the bus master 11 with the ARB bit on line 26 set, then the bus master 11 infers that the interface 13 noted by the address bus 25 desires additional capacity. During the next frame 17, one or more additional time slots is granted to that interface 13, if available, for each such slot with ARB set. Time slots (cells) are granted by sending out from master 11 on sub-bus 14 a cell having the address of the requesting interface 13 on the address bus 24. Optimally, the number of slots available to each interface 13 then doubles or multiplies with each frame 17. The rate-multiplication function of the ARB line 24 may be a policy issue; various algorithms (other than, say, simple doubling) can be used, and, in any event, the algorithm is implemented centrally in the bus master 11.

Two conditions limit this rate increase granted to an interface 13 (to a virtual channel), these conditions being supply and demand. Supply limiting occurs when there are no more unassigned time slots per frame 17. In such case, it is likely that simply discarding additional ARB requests by the bus master 11 will behave correctly (proportionately), because the ARB requests from any given source are maximally spaced around the frame by the bus master 11. Demand limiting occurs when there is no more data to be sent; an interface 13 should only assert ARB on line 26 once for each cell that it is actually holding in buffers waiting to send, ideally minus the number of cells granted via the committed information rate (CIR). For example, referring to FIG. 7 if an interface had 20-cells of data to send in its buffer, it would send one cell 18a (its CIR) in the first frame with ARB set, two cells 18b in frame-2 (granted another cell by the master) both with ARB set, four cells 18c in frame-3 with all four having ARB set, eight cells 18d in frame-4 but backing off now since only five cells of data are left in its buffer. In frame-4 eight cells are sent but only four with ARB set, so in frame-6 the remaining five cells 18e are sent, none with ARB set. In frame-7 this port will have only its one cell (CIR) available in case it has by then additional data to send.

If a virtual channel is defined as constant bit rate (CBR), then the ARB indication on line 26 is ignored (and actually shouldn't be sent) for that virtual channel ID, as the committed rate CIR for a CBR channel equals its peak rate.

Figure 8:
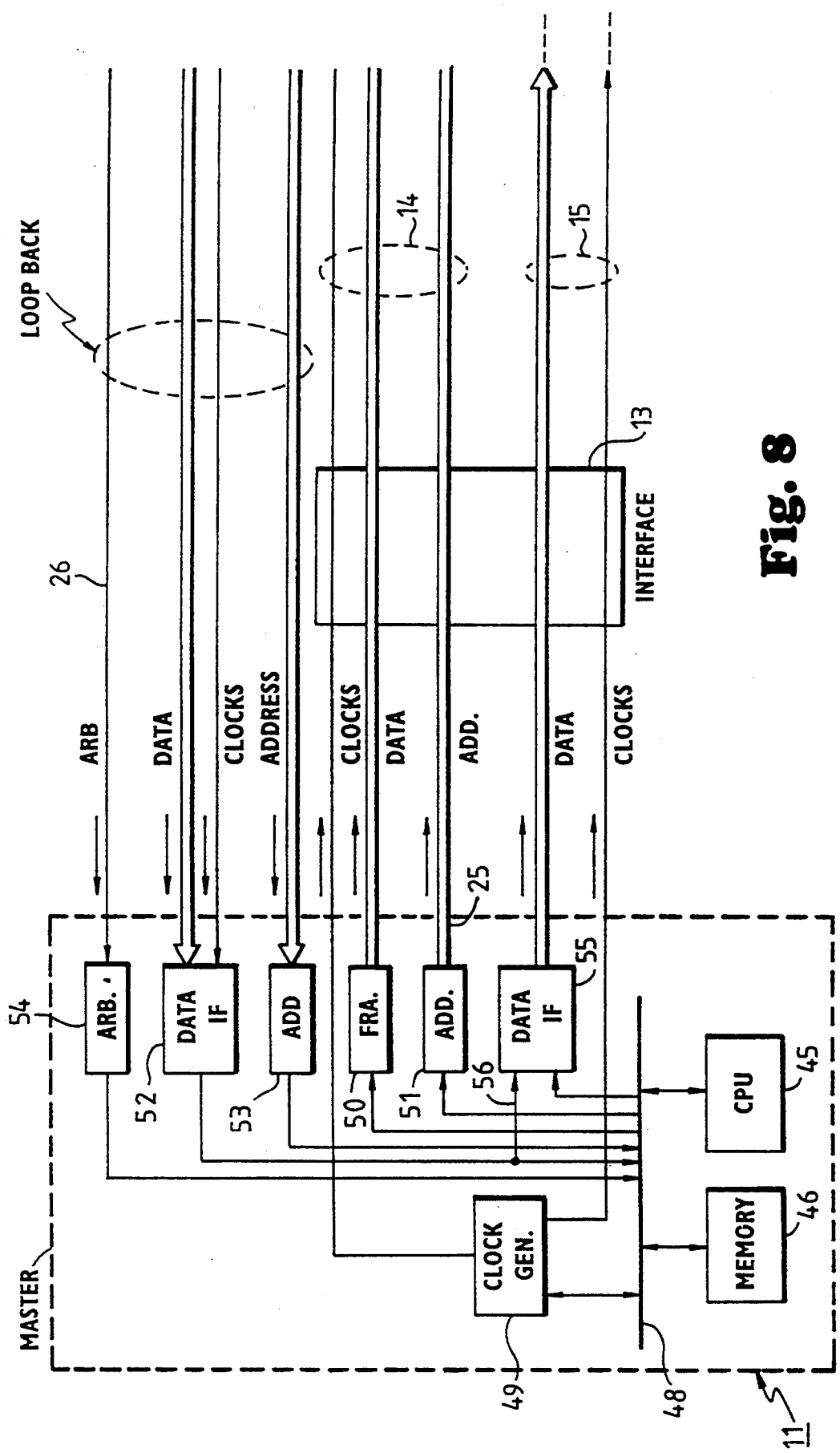
FIG. 8 is an electrical diagram in block form of the master station and bus of FIGS. 1 and 4.

Referring to FIG. 8, the -master station 11, in one embodiment, includes a controller consisting of a CPU 45 with a memory 46 connected by a system bus 48. The CPU executes a program to implement the various control and arbitration algorithms. Similarly, a state machine or sequencer could be used to implement these control functions. A clock generator 49 generates the clocks for applying to the lines 22-24 and 29-31, and also clocks the controller or CPU 46 executing the control algorithm. The master 11 sends out bare frames on the lines 20 of the data-send sub-bus 14 by means of a bus interface 50 driven from the controller, and an address interface 51 drives the selected address onto lines 25 in synchronization with the cells of the frame, all under control of the CPU 46 via bus 48. A data interface 52 is the data sink receiving the frames from the lines 20 which have looped through the interfaces 13. The addresses on line 25 are also received back at the master 11 at a receiver 53, after looping through the interfaces, so timing is maintained explicitly, since the bus may be several wavelengths long. That is, when a bit clock is received back after looping, the address then appearing on the lines 25 at address receiver interface 53 is associated with the data on lines 20 at receiver interface 52. At the same time, the arbitration line 26 is monitored at interface 54 by the controller, so if a cell sent by an interface is requesting additional time slots for a virtual channel, then the controller records this for use in generating addresses to be sent out on lines 25 in the next frame 17. A data interface 55 is used to drive data out onto the bus lines 27 of data-receive sub-bus 15, in synch with the clocks on lines 29-31, under control of the CPU. If data coming in on lines 20 of sub-bus 14 from one interface 13 is being sent to another interface 13 on lines 27 of the sub-bus 15, a loop back path 56 may be provided so it can go out on the next clock. If, however, the protocol requires the controller to verify the channel ID then the cell is buffered in some kind of memory, the address checked, and the cell is sent back out with more than one clock latency (i.e., not directly routed via loop-back path 56).

An important feature is the bus arbitration implemented by the controller in the master station 11. This arbiter grants time slots to interfaces 13 both statically and dynamically. The fundamental nature of the operation of the bus 10 is to divide bandwidth (cells) into two pools. One pool is pre-arbitrated according to the committed information rate (CIR) of all virtual channels. These cells are in effect static, changed by connection management when the CIR of a given virtual channel is changed; the time frame of such a change is measured in many milliseconds. The other pool (the remaining cells) is granted to interfaces 13 which request additional bandwidth by setting the ARB line 26 when transmitting. Since both CIR and arbiter-granted cells coming back into the master 11 via sub-bus 14 may have ARB set, the effect is to multiply bandwidth per virtual channel per frame, as in the example of FIG. 7.

Figure 7:
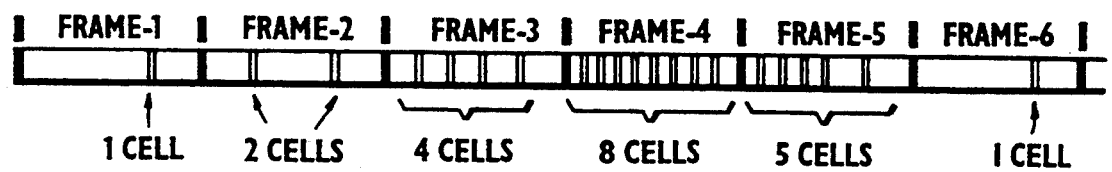
FIG. 7 is a timing diagram of frames and cells for an arbitrated data send operation in the system of FIG. 1, in one example.

A goal of the arbitration is to minimize congestion. One of the inherent difficulties in establishing reliable, efficient ATM networks is the avoidance of short-term congestion loss. Clusters of cells belonging to a given virtual channel can form a "bulge" through a network, increasing the burstiness of circuits and increasing the probability of loss (by overflowing buffers or the like). Some ATM networks may also enforce peak rates by discarding cells that arrive on a given virtual channel in clusters of more than m out of n cells. The arbitration algorithm minimizes these clusters by maximally spacing the slots assigned to any given virtual channel or interface within every bus frame 17. For example, assume a bus speed and frame duration set such that a frame has 2048 cells (time slots) numbered 1-to-2048. A given channel ID is allocated a committed rate of 1-Mbps, which for the sake of illustration equates to two cells 18 per frame 17. So, the given channel ID is statically assigned two cells in the frame 17, each approximately 1024 cells apart, such as the cells numbered 200 and 1225. Now, a burst of data arrives at the interface, and so additional cells need to be assigned. Ideally, these should each be around cell positions numbered 712 and 1740. If cell 712 then requested more bandwidth, a cell would be granted midway between 1740 and 1225; say around 1996. FIG. 7 also illustrates the spacing of cells granted in response to ARB set on cells sent.

Since arbitration may occur with each cell arriving at the master 11, arbitration must occur in less than a microsecond, given the cell rate of the bus. Thus a fast method for cell assignment is used. In one embodiment, a table lookup technique is employed. Each cell number 1-to-2048 is assigned (statically) a table of "next" cell numbers to hunt for. This takes into account three factors: (1) cell number, (2) multiple of committed rate CIR in the number of cells/VC/frame, and (3) choice list for cell numbers. Number of cells/frame is needed in order to provide the correct offset from the exact opposite, lest clusters of cells form "facing each other" across the frame. A choice list is required because the first choice may already be assigned.

One approach to selecting cells in arbitration is to group all time slots into categories. Cells are initially assigned from one category ("brown", following resistor code), and these arbitrate for a second category ("red"). Thus the current CIR multiple is implicit, as a virtual channel expands from red to orange to yellow to green cells. Since green cells are only reached by virtual channels that are at $2^5$ times their CIR, which should not be very often, these form a pool whose members may be reached from practically any starting cell. (The concept of having a large number of little-pooled resources overflowing to a separate group of more-pooled resources dates back at least to the Strowger telephone exchange, in which it is called a "graded multiple".) The actual layout of the frame is a repetitive sequence of cell categories.

The local network of FIG. 1 would most likely have external interfaces to wide area networks, fiber optic links, etc. For example, one of the interfaces 13 may be to an ATM trunk, or the master may be to a public ATM network. No critical distinction is made between "line" and "trunk" ATM interfaces. However, the use of a framed time-slot mechanism of FIG. 2 provides numerous options, in addition to the various types of ATM interface. One option is to allow pure isochronous interfaces. Another option is to run the bus master's time slot allocation mechanism in accordance with the plesiochronous transfer mode as described in application Ser. No. 509,563 mentioned above. The system of application Ser. No. 509,563 uses slotted ATM across a wide area using phase-locking of the time slot allocation mechanisms.

The ATM-oriented switching system may also directly terminate non-ATM protocols by performing adaption on interfaces. For example, an FDDI line card could perform the segmentation and reassembly function, encapsulating an FDDI frame within a sequence of ATM cells. CBR circuit-mode interfaces could also be attached, using standard synchronous or isochronous interfaces such as RS-422 and T1.

The interface card 13 that plugs into the bus 10 performs a number of functions. These include generic ATM functions as well as service-specific functions that relate to the type of card. Several alternative types of interface may be used.

One type of interface 13 is a direct ATM interface. These are key to the "ATM LAN" concept, providing access for ATM interfaces on workstations, servers, public networks, etc. All of these share the same generic architecture, but at least five separate physical mechanisms have been described for intra-office ATM:

(a). 155-Mbps SONET. This is the B-ISDN norm, using single-mode fiber optics cables.
(b). 155 Mbps electrical. This is a B-ISDN option, allowing copper wire for the physical medium.
(c). 100/125 Mbps optical. This uses FDDI's physical layer and 5/4 encoding, providing 100-Mbps net capacity.
(d). DS3-internal. A current IEEE project is creating a 45-Mbps variation on T3 carrier for intra-building use. This will probably offer the choice of electrical or optical, with simple framing/formatting (compared to DS3).
(e). 155/194 Mbps, optical, block coded. This uses the FibreChannel 8/10 bit encoding, providing the same payload as SONET over local areas.

Another type of interface 13 is a LAN bridge interface. These provide direct connection to LANs, such as Ethernet, FDDI and token ring. The nature of the encapsulation, translation and/or adaption protocols is a matter of design selection.

A third type of interface is the isochronous/synchronous interfaces. These provide a bit-stream service useful for non-packet applications, such as video, audio, or random data protocols.

Other functions may be integrated into a "smart hub" system, making use of some of the same concepts as these interfaces.

Figure 9:
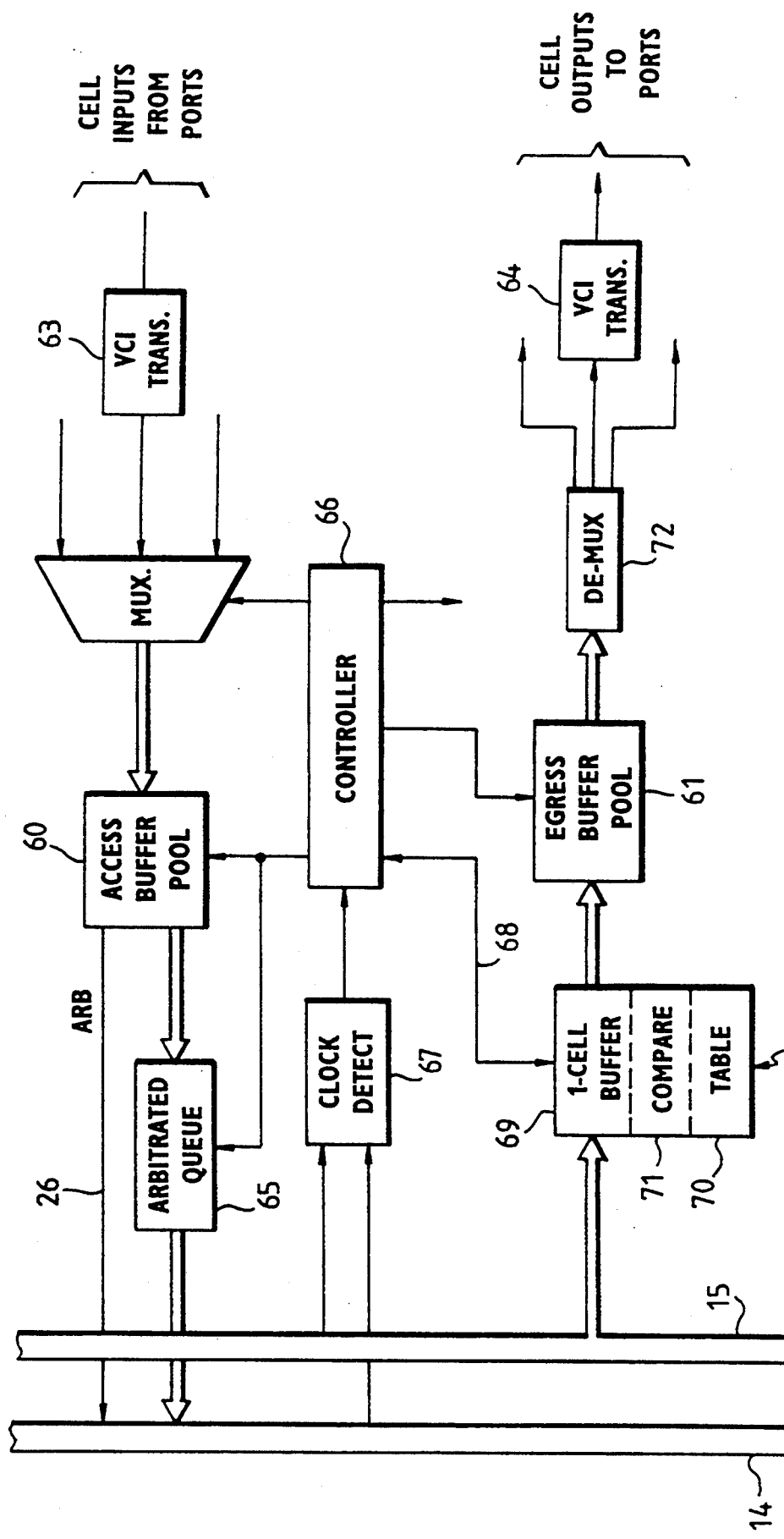
FIG. 9 is an electrical diagram in block form of an interface used in the system of FIG. 1, according to an example embodiment.

Referring to FIG. 9, the interface 13 provides a number of general ATM functions. These include access and egress buffering using buffers 60 and 61, virtual channel ID recognition circuit 62, channel ID translation in circuits 63 and 64, multiplexing/demultiplexing (sorting cells vs. channels), and bus arbitration. The simplest case, a direct ATM interface, has several functions performed at the interface 13.

One function at the interface 13 is channel ID translation in circuits 63 and 64, which is required because channel IDs are nominally local to the individual port 12, of which a single interface circuit 13 may provide several, while the bus 10 uses a common pool of virtual channel ID values local to itself. The port-local ID of a cell is thus translated by circuit 63 to the bus-local ID before being sent onto the bus 10. The IDs of received cells are translated by circuit 64 before being sent on to their destination port.

Another function at the interface 13 is access buffering in the buffer 60. This is required because several flames 17 may be required to pass before the arbiter grants enough bandwidth to satisfy demand, as depicted in FIG. 7. A large pooled buffer determines how much bandwidth to request via arbitration; cells from the head of the queue are then moved to the bus access circuitry, i.e., arbitrated queue 65. The interface may also take virtual channel type into account, providing different treatment for constant bit rate channels and variable bit rate channels. Control of the interface 13 is by a controller circuit 66, receiving timing from the bus 10 via clock detector 67 and commands from the data stream via input 68.

All cells on the receive sub-bus 15 have their channel IDs screened in the circuit 62, using a 1-cell buffer 69 where the content of the bus 15 is held for a clock and compared against a table 70 of unicast and multicast addresses of interest to the interface 13, using a comparator 71. If the cell is not of interest, it is discarded. If the cell is of interest, it is moved to the egress buffer 61. The egress buffer in turn performs speed matching and buffering for whatever speed the output is allocated. It is then routed to the appropriate egress port via demultiplexer 72.

Congestion loss is minimized by providing each virtual channel with a dedicated (small) buffer pool within the egress buffer 61, and with a (large) common buffer pool available for all virtual channels, also within the buffer 61. Various buffering strategies can be used, depending upon the system requirements. Explicit congestion indication may be provided here, if the length of the queue for any virtual channel exceeds a desirable limit.

Various other functions may be provided by the interface 13, depending upon port type. In the simplest case, a direct ATM port, these are primarily related to physical-layer framing issues. If the port performs a data-communications-specific function, such as LAN interconnection, then the interface 13 may need to translate the "native" protocol into the ATM cell-oriented format. Thus the interface must implement some sort of ATM adaption layer function. There are several potential ATM adaption layers, functioning as data link layers, which may be useful here. The choice of ATM adaption layer (called AAL) may impact the hardware design. In the case of the CCITT-specified Type 3/Type 4 AAL, recommended for data applications, the protocol is very complex, with header and trailer information in each cell, and header and trailer information in each packet. The newer Type 5 AAL, proposed by the computer industry as an alternative, has no per-cell overhead and only a per-packet trailer. Note that both the cell and frame may have CRCs; the cell typically uses a 10-bit CRC, while the frame uses a 32-bit CRC. Additional, non-CCITT AALs are also potentially useful for data.

Because of the two-speed nature of the bus clock, much of the circuitry can run at relatively low speed, reducing the cost. This is intended to allow for implementations at per-port costs competitive with other high-performance LAN technologies. A typical implementation of this invention might have 500 ports, each with a speed of 155-Mbps, sharing a single 1200-2000 Mbps backplane (bus) bandwidth. This level of performance is probably good for two generations beyond the level of FDDI, and performance can be increased by multiple instantiation of the bus 10.

Because the bus is synchronous and arbitration is both centralized and based upon 8-kHz framing, bandwidth can also be allocated to synchronous users. This permits an evolution towards a "fast circuit" mode of switching which may be useful for some applications or at speeds higher than B-ISDN ATM in the future. Connections can be made and broken in low millisecond time frames. Note that a connection-request protocol is not defined herein.

One issue important in implementation of the bus 10 is reflected waves. An important feature is providing an economical high-speed data transfer bus (DR and DS). Unlike many conventional high-speed buses, such as Futurebus+, the DT bus described here is potentially quite long, so the problem of reflected signals becomes critical. Many prior bus implementations are distance-limited by their arbitration requirements; propagation delays along the bus interact with bus granting. The bus arrangement herein described does not have such a limit, as the DR and DS sub-buses 14 and 15 are separately arbitrated, with only the centralized bus master 11 having the right to send on the DR sub-bus 15. However, any reflected power within either bus can interfere with signals up to several clock cycles away. This makes the analog design issues important. Clearly, the bus 10 must be designed to have as constant an impedance as possible, with proper termination 16 and termination at the loop back of bus 14 to the master 11.

Figure 10:
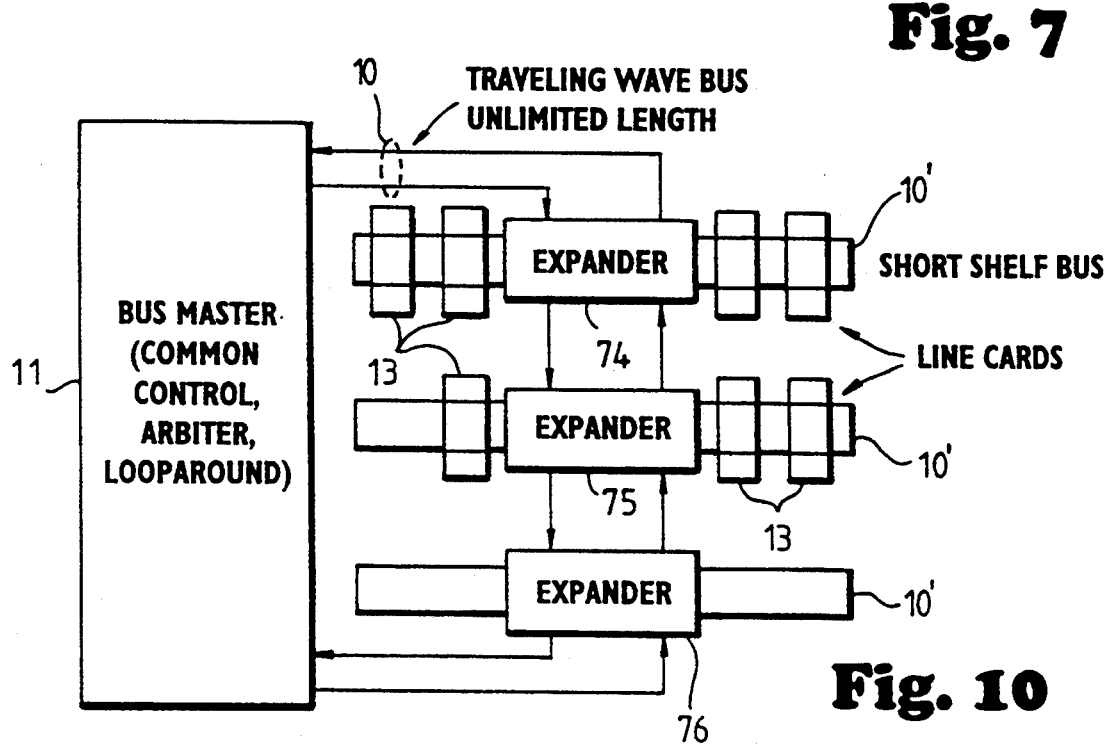
FIG. 10 is an electrical diagram in block form of a hierarchical realization of the bus of FIG. 1, according to another embodiment.

Referring to FIG. 10, one possible strategy to minimize this problem is to implement the bus in a hierarchy. The top level is the inter-shelf bus 10 which connects to the bus master 11. These connections are actively reclocked and regenerated by each shelf interface ("expander") 74, 75, 76, etc., with the interfaces 13 connected to the short shelf busses 10' rather than to the long main bus 10. In this way, each leg of the bus 10' within a shelf is electrically point-to-point, and usually short. Each shelf then has a physically short distribution backplane (no more than 50 cm.), whose length is short enough that small amounts of reflected power (as result inevitably from bus connectors) are not critical.

The expander 74, 75, 76, introduces some small delays in reclocking shelf data from bus 10' onto the master bus 10, but this is not important to the arbitration mechanism. The actual division of work between interface cards 13 and the expander is a design choice; some buffering and the bandwidth allocation functions can be moved here, with the physical shelves being used for simpler interface circuits.

One alternative for the traveling wave bus 10 is to use coding other than simple NRZ in order to lower the analog bandwidth requirement. For example, AMI encoding (duo-binary RZ) reduces the analog bandwidth in half by alternating the direction of the "1" pulses relative to the "0" pulse.

Another alternative is to make the traveling wave bus (at least the DT portion) optical instead of electrical. Inexpensive LEDs and plastic fiber optics can support a bit clock of 100-MHz, while optics are relatively immune to reflections and other disturbances. The expander then performs an optical/electrical conversion; the traveling wave bus is implemented as a chain of optical point to point links between expanders, while shelves are electrical.

Redundancy of critical equipment is likely to be a requirement. The bus master hardware and the expanders are likely to need replication for high reliability applications.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments which fall within the true scope of the invention.

What is claimed is:

1. A method of operating a communications network having a master station and a plurality of ports, comprising the steps of:

sending, from said master station to said plurality of ports or at least one clock line in a parallel bus, a continuous repeating clock sequence defining repetitive fixed-length frames with a selected fixed number of cells per frame;

sending, from said master station to each one of said ports, on address lines in said parallel bus, identification of only one of said ports which is to be allowed to send data on said parallel bus during each one of said cells of one of said frames, wherein the identification of only one of said ports which is to be allowed to send data on said parallel bus during a first one of said cells of said one of said frames is different from the identification of only one of said ports which is allowed to send data on said parallel bus during a second one of said cells of said one of said frames;

receiving data at said master station on data-send lines of said parallel bus from a plurality of said ports in said one of said frames along with said identification on said address lines for said each cell of said one of said frames; and sending data from said master station to a plurality of said ports on data-receive lines of said parallel bus in said cells of another one of said frames synchronized by said clock sequence, along with identification of a receiving port contained in each cell of said another one of said frames;

said data-send lines and said data receive lines being separate from said address lines.

2. A method according to claim 1 wherein each one of said ports defines at least one virtual channel for said network, and a plurality of said virtual channels are provided on said network at a given time.

3. A method according to claim 1 wherein said identification is of a virtual channel.

4. A method of operating a communications network having a master station and a plurality of ports, comprising the steps of:

sending, from said master station to said plurality of ports on at least one clock line in a parallel bus, a continuous repeating clock sequence defining repetitive frames with a selected fixed number of cells per frame;

sending, from said master station to each one of said ports, on address lines in said parallel bus, identification of which one of said ports is allowed to send data on said parallel bus during one of said cells of a frame;

receiving data at said master station on data-send lines of said parallel bus from a plurality of said ports in said one of said frames along with said identification on said address lines for each cell of said one frame;

sending data from said master station to a plurality of said ports on data-receive lines of said parallel bus in said cells of another of said frames synchronized by said clock sequence, along with identification of a receiving port contained in each cell;

said data-send lines and said data-receive lines being separate from said address lines;

including the step of receiving at said master station a request signal from one of said ports in synchronization with said identification of said port on said address lines, and in response to said request signal, sending identification of said one port with at least one additional cell per frame.

5. A method according to claim 4 wherein said request signal is received by said master station on an arbitration line which is part of said parallel bus.

6. A method of operating a communications network having a master station and a plurality of ports, comprising the steps of:

sending, from said master station to said plurality of ports on at least one clock line in a parallel bus, a continuous repeating clock sequence defining repetitive frames with a selected fixed number of cells per frame;

sending, from said master station to each one of said ports, on address lines in said parallel bus, identification of which one of said ports is allowed to send data on said parallel bus during one of said cells of a frame;

receiving data at said master station on data-send lines of said parallel bus from a plurality of said ports in said one of said frames along with said identification on said address lines for each cell of said one frame;

sending data from said master station to a plurality of said ports on data-receive lines of said parallel bus in said cells of another of said frames synchronized by said clock sequence, along with identification of a receiving port contained in each cell;

said data-send lines and said data-receive lines being separate from said address lines; and wherein said clock sequence includes a bit clock, a cell clock and a frame clock.

7. A method of operating a communications network having a master station and a plurality of ports, comprising the steps of:

sending, from said master station to said plurality of ports on at least one clock line in a parallel bus, a continuous repeating clock sequence defining repetitive frames with a selected fixed number of cells per frame;

sending, from said master station to each one of said ports, on address lines in said parallel bus, identification of which one of said ports is allowed to send data on said parallel bus during one of said cells of a frame;

receiving data at said master station on dam-send lines of said parallel bus from a plurality of said ports in said one of said frames along with said identification on said address lines for each cell of said one frame;

sending data from said master station to a plurality of said ports on data-receive lines of said parallel bus in said cells of another of said frames synchronized by said clock sequence, along with identification of a receiving port contained in each cell;

said data-send lines and said data-receive lines being separate from said address lines; and wherein said data-send lines and said address lines are looped around said ports to begin and to terminate in said master station.

8. A communications network, comprising:

a parallel bus having a data-send sub-bus, a data-receive sub-bus, address lines and at least one clock line;

a master station connected to said parallel bus and generating the content of said data-receive sub-bus, said address lines and said at least one clock line;

a plurality of ports each coupled to said parallel bus and able to send data on said data-send sub-bus and to receive data on said data-receive sub-bus in synchrony with clocks on said at least one clock line;

means in said master station to apply clocks to said at least one clock line to define repeating frames, each frames having selected number of cells, and each cell having a selected number of octets;

means in said master station to send data on said data-receive sub-bus to a selected one of said ports, as selected by an address on said address lines;

means in said master station to allot to each of said ports one or more of said cells of each of said frames for sending of data on said data-send sub-bus;

means in each of said ports to send data to said master station on said data-send sub-bus during only an allotted one of said cells; and means in each said port to send an allocation request to said master station to change the number of cells allotted to a port; and means in said master station responsive to said allocation request to send a message to one of said ports to change the number of cells allotted to said port in each frame.

9. A network according to claim 8 wherein said clocks applied to said at least one clock line includes a bit clock, a cell clock and a frame clock.

10. A network according to claim 8 wherein said allocation request is sent to said master station on an arbitration line which is part of said parallel bus.

11. A network according to claim 8 wherein said data-send sub-bus is looped around said ports to begin and to terminate in said master station.

12. A network according to claim 8 wherein said data-receive sub-bus originates in said master station and extends to said ports then terminates remote from said master station.

13. A network according to claim 8 wherein a plurality of virtual channels are supported by at least one of said ports.

14. A method of operating an interface for a communications network, comprising the steps of:
    detecting a synchronizing clock sequence on a parallel bus defining a frame sequence of a plurality of numbered cells;
    if said interface has data to send, sending said data in one of said cells of said frame sequence allotted by number to said interface, and other ports of said network sending data in other of said cells of said frame sequence allotted to said other ports by number;
    if said interface having said data to send has a volume of information in said data which requires a substantial number of said cells to complete said sending, then sending by said interface a request for more cell allotments to a master station during said one of said cells;
    thereafter detecting at said interface during a later cell in said frame sequence an address for said interface on said parallel bus, indicating allotment of a subsequent cell to said interface, and sending said data on said parallel bus in said subsequent cell;
    if said interface is to receive data, detecting an identification for said interface on said parallel bus in a cell of said frame sequence and extracting data from said parallel bus during said cell.

15. A method according to claim 14, wherein said parallel bus includes a send-data sub-bus and a receive-data sub-bus, said step of sending said data is on said send-data sub-bus, and said step of extracting data is from said receive-data sub-bus.

16. A method according to claim 15, wherein said parallel bus includes an address sub-bus, and said step of detecting an address on said address sub-bus; and wherein said step of detecting an identification is from said receive-data sub-bus.

17. A method according to claim 14, wherein said parallel bus includes frame clock line, a cell clock line, and a bit clock line, and said step of detecting a synchronizing clock sequence includes detecting voltages or optical signal levels on said clock lines.

18. A method according to claim 16 including the steps of:
    generating at a master station and applying to said parallel bus said synchronizing clock sequence;
    applying addresses to said address sub-bus to grant to said interface selected ones of said cells in a frame;
    receiving on said send-data sub-bus said data sent by said interface;
    sending on said receive-data sub-bus said data to be extracted and said identification.

19. A method according to claim 14 wherein said cells are defined in repeating frames, each frame having a plurality of said cells.

20. An interface for a communications network, comprising:
    means coupled to a parallel bus for detecting a synchronizing clock sequence defining a plurality of numbered cells;
    means coupled to said parallel bus for sending data on said parallel bus in one of said cells allotted by number to said interface, if said interface has data to send, said parallel bus transferring data during said clock sequence from a plurality of nodes in said network in other of said cells allotted by number to said nodes;
    means coupled to said parallel bus for sending a request for more cell allotments to a master station during said one of said cells, if said interface requires a substantial number of cells of data to send;
    means coupled to said parallel bus for thereafter detecting during a later cell an address for said interface on said parallel bus, indicating allotment of a subsequent cell to said interface, and for thereafter sending said data on said parallel bus in said subsequent cell;
    means for detecting an identification for said interface on said parallel bus in a cell and extracting data from said parallel bus during said cell, if said interface is to receive data.

21. An interface according to claim 20, wherein said parallel bus includes a send-data sub-bus and a receive-data sub-bus, said sending of said data is on said send-data sub-bus, and said extracting data is from said receive-data sub-bus.

22. An interface according to claim 21, wherein said parallel bus includes an address sub-bus, and said detecting an address is from said address sub-bus; and wherein said detecting an identification is from said receive-data sub-bus.

23. An interface according to claim 20, wherein said synchronizing clock sequence defines a repeating series of frames, each frame having a plurality of cells.

24. A method of operating a communications network having a master station and a plurality of ports interconnected by a bus, comprising the steps of:
    sending, from said master station to said plurality of ports on said bus, a repeating clock sequence defining repetitive frames with a selected number of cells per frame;
    sending, from said master station to each one of said ports, on said bus, identification of a plurality of said ports and which one of said ports is allowed to send data on said bus during each one of said cells of a frame;
    receiving data at said master station on said bus from a plurality of said ports in a frame along with said identification of which port is sending in a cell; and receiving with said data at said master station on said bus an arbitration request from each of said ports wanting additional channel allocation for sending data;
    sending, from said master station to each of said ports wanting additional channel allocation, on said bus, identification of said ports in additional ones of said cells in a later frame to allow said ports to send additional data on said bus during said later frame, said additional ones of said cells being spaced evenly along the length of said frame to minimize burstiness of traffic on said bus.

25. A method according to claim 24 wherein said bus is a parallel bus having data lines for said data and address lines for said identification.

26. A method according to claim 25 wherein said bus includes clock lines for said repeating clock sequence.

27. A method according to claim 24 wherein said additional ones of said cells are spaced evenly along the length of said frame to minimize burstiness of traffic on said bus.

* * * * *